Aug. 22, 1961  J. ROEDER, JR  2,996,889
REFRIGERATING APPARATUS
Filed Feb. 17, 1958

INVENTOR.
John Roeder, Jr.
BY Schroeder, Hofgren
Brady & Wegner
ATTYS.

United States Patent Office 2,996,889
Patented Aug. 22, 1961

2,996,889
REFRIGERATING APPARATUS
John Roeder, Jr., Benton Harbor, Mich., assignor to Whirlpool Corporation, a corporation of Delaware
Filed Feb. 17, 1958, Ser. No. 715,746
2 Claims. (Cl. 62—3)

This invention relates to an apparatus for selectively heating and cooling as desired a contained product.

The apparatus of this invention is preferably in the form of a portable container of any desired size adapted to heat or cool a contained product as desired by thermoelectric means. This thermoelectric means is in the form of a heat pump and means are provided for either extracting heat from the interior of the container and pumping to the exterior atmosphere or upon reversal of the direction of direct current flow pumping heat from the atmosphere into the interior of the container.

The apparatus of this invention is preferably portable so that it can be transported and can be used anywhere there is a source of direct current. Thus, it can be used in automobiles, boats, airplanes, hotels, homes and other places where such current is available. It can be used either for heating or for cooling articles such as foods depending upon the direction of current flow. In one embodiment the apparatus can be used like a dish at the table provided the proper current supply is available. It can also be used in the freezing compartment of a refrigerator by providing a D.C. power supply to this compartment to decrease the time required for freezing and can then be removed from the freezing compartment and upon connection to another exterior power supply the frozen condition can be maintained. Similarly, when the apparatus is being used to keep food or other articles hot the hot food can be placed in the apparatus and kept hot indefinitely.

One of the features of this invention therefore is to provide such an apparatus comprising a hollow container having an inner chamber for the product and an electrical and thermal insulating outer wall, and thermoelectric elements in said wall providing hot and cold junctions when thermoelectrically interconnected, one of said junctions including an inner terminal member located adjacent to an inner surface portion of said wall in heat transfer relationship with said chamber and substantially following the contour of said portion, and the other junctions including an outer terminal member located adjacent to the exterior surface of said wall in heat transfer relationship to the exterior of said container.

Other features and advantages of the invention will be apparent from the following description of certain embodiments thereof taken in conjunction with the accompanying drawings, in which.

Figure 1:
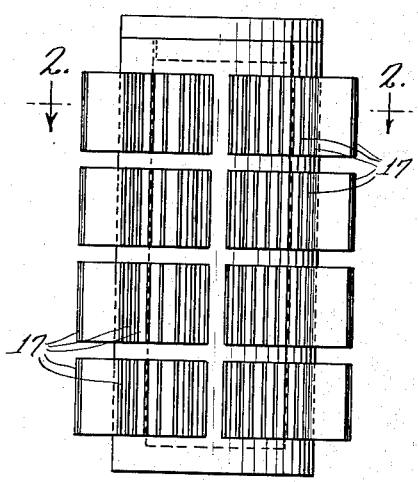
FIGURE 1 is a side elevational view of an apparatus embodying the invention.
Figure 2:
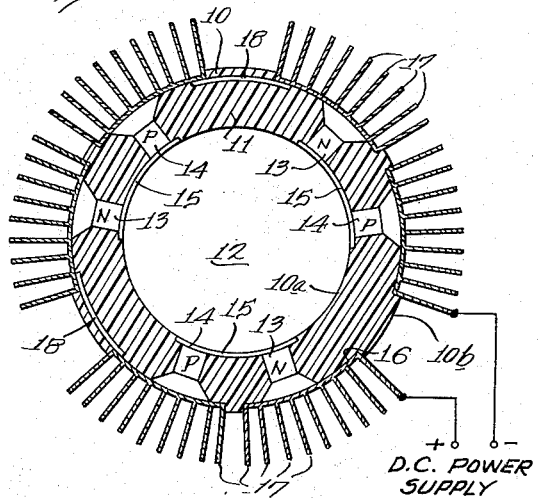
FIGURE 2 is a horizontal sectional view taken substantially along line 2—2 of FIGURE 1.

In the embodiment shown in FIGURES 1 and 2 the container 10 is generally cylindrical and is provided with relatively thick insulating side 11 and bottom 12 walls, preferably made of a cellular insulating material such as cellular polystyrene.

Mounted in the wall 11 of the container is a plurality of pairs of spaced thermoelectric elements 13 and 14. These elements are of electrically dissimilar metals or alloys. The dissimilar thermoelectric elements form a thermocouple as they are connected by electrical conducting metal strips 15 as inner terminal members which are preferably copper or some other efficient conducting metal.

In the illustrated embodiments the thermoelectric elements of each thermocouple are labeled N and P. Those marked N are of materials having an abundance of electrons and bismuth is a good example of this kind of material. Those marked P are of materials having an abundance of electron vacancies and antimony may be used as the P type material. As is well understood by those skilled in the art there are many types of metals or alloys that may be used for the N type and for the P type material.

In the embodiment shown in FIGURES 1 and 2 there are provided four vertically spaced horizontal series of thermocouples. In each the copper strip 15 between each pair of thermoelectric elements in a thermocouple is closely adjacent to the interior wall 10a of the container. In fact, as is illustrated in FIGURE 2, these strips have their inner surfaces forming continuations of the inner surface of the container. The outer ends of each thermoelectric element 13 and 14 are connected to a metal strip 16 as an outer terminal member also preferably of copper lying along the outer wall 10b of the container. These outer strips 16 are provided with outwardly extending radiating copper fins 17 which serve to dissipate heat into the atmosphere when the apparatus is used for cooling a product within the apparatus and which serves to gather heat from the atmosphere when the apparatus is used for heating a product within the container.

As is shown in FIGURE 2, one thermoelectric element of one pair is connected to an element of a next pair by means of a metal strip 18 also preferably of copper in order to complete the circuit. As is shown in FIGURE 2 the power supply for this circuit is a source of D.C. current. In the embodiment shown, the connections are for cooling the interior of the container 10. Thus the positive terminal is connected to a fin 17. The negative terminal is connected to a fin of a P element at the end of the electric circuit. Each of the pairs of thermoelectric elements forming thermocouples is electrically connected to an adjacent pair through the copper strips 18. At the end of each horizontal circuit similar strips (not shown) connect the horizontal bank to the adjacent horizontal bank so that current flows from the D.C. power supply through all of the thermocouples in the customary manner.

In the embodiment shown in FIGURE 2, the copper strips 15 on the interior of the container 10 operate as heat absorbers to cool the interior of the container. The strips 16 and fins 17 on the exterior of the container operate as heat dissipaters. Thus the interior of the container is efficiently cooled so that products contained in the container are also cooled. If the direction of current were reversed from that shown in FIGURE 2 the strips 16 and fins 17 would then operate as heat absorbers and the strips 15 would operate as heat dissipaters to keep the interior of the container hot. Thus the container is selectively usable for heating or cooling the contents of the container depending upon the direction of current flow. Thus the apparatus either refrigerates or heats by means of the well known Peltier effect.

Figure 3:
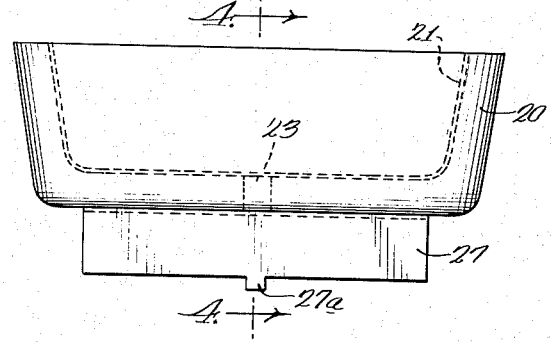
FIGURE 3 is a side elevational view illustrating a second embodiment of the invention.
Figure 4:
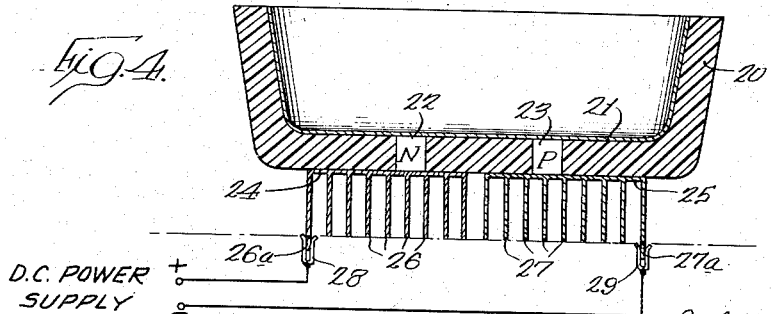
FIGURE 4 is a sectional elevational view taken substantially along line 4—4 of FIGURE 3 and showing the apparatus removably connected to a power supply.

In the embodiment shown in FIGURES 3 and 4 the container 20 is in the form of a dish which may or may not be provided with an insulating cover as desired. The interior of this container is preferably lined with an electrical conducting metal 21 operating as an inner terminal member which is preferably copper. Extending through the bottom of the container 20 and attached to the copper liner 21 is a thermocouple made up of an N thermoelectric element 22 and a P element 23. The bottom of the N element is connected to a metal strip 24 preferably of copper while the bottom of the P element 23 is similarly connected to a metal strip 25. Each of these strips operates as an outer terminal member and is provided with downwardly extending fins 26 and 27.

In the embodiment illustrated the outermost fins 26 and 27 are provided with downwardly extending projecting prongs 26a and 27a. These prongs are adapted to engage corresponding receptacles 28 and 29 which in turn are connected to a source of D.C. power.

The container 20 may be used to either heat or cool foods or the like. Thus, in the embodiment shown, the electrical connections are for cooling. If a frozen product is desired the electrical connections may be made as illustrated on the interior of a freezing compartment of a refrigerator and the thermoelectric cooling will hasten the freezing process. Then, with a system as illustrated in FIGURE 4, the container with the frozen food product may be transferred to the table and the frozen condition maintained. Similarly, by reversing the direction of current flow, the apparatus shown in FIGURES 3 and 4 may be used at the table for keeping foods hot.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:
1. Apparatus for selectively heating and cooling a contained product, comprising: a portable container for the product having a continuous electrical and thermal insulating wall; electrically dissimilar thermoelectric elements securely positioned in spaced openings in said wall, the wall being otherwise substantially continuous; a plurality of terminal members interconnecting said elements in electrical circuit to provide hot and cold surfaces, a pair of said terminal members being located adjacent an exterior surface of said wall in heat transfer relationship to the exterior of said container; a pair of projecting members associated with said pair of terminal members; and a pair of sockets releasably receiving said projecting members and connected to a source of electric current for supplying said current to said circuit.

2. Apparatus for selectively heating and cooling a contained product, comprising: a container defining a space for holding the product, said container having a continuous electrical and thermal insulating wall; electrically dissimilar thermoelectric elements securely positioned in spaced openings in said wall, the wall being otherwise substantially continuous, said elements each having an inner surface facing said space; and a plurality of terminal members interconnecting said elements in electrical circuit to provide hot and cold surfaces, certain of said terminal members each having an inner surface facing said space and an oppositely located outer surface engaging an element so that outward pressure within said space caused by said contained product tends to urge said certain terminal members outwardly toward their respective elements.

References Cited in the file of this patent
UNITED STATES PATENTS

| | | |
|---|---|---|
| 413,136 | Dewey | Oct. 15, 1889 |
| 1,818,437 | Stuart | Aug. 11, 1931 |
| 2,734,344 | Lindenblad | Feb. 14, 1956 |
| 2,919,553 | Fritts | Jan. 5, 1960 |

FOREIGN PATENTS

| | | |
|---|---|---|
| 4,141 of 1926 | Australia | Oct. 6, 1927 |